United States Patent [19]

Black

[11] Patent Number: 4,685,499

[45] Date of Patent: Aug. 11, 1987

[54] STEERING WHEEL COVER

[76] Inventor: Todd W. Black, 8311 Woodlake Pl., Tampa, Fla. 33615

[21] Appl. No.: 853,756

[22] Filed: Apr. 18, 1986

[51] Int. Cl.⁴ .................................................. B62D 1/06
[52] U.S. Cl. ................................ 150/52 M; 150/52 K
[58] Field of Search .............. 150/52 K, 52 M, 54 A, 150/54 B; 74/558; 206/304, 831; 229/DIG. 3, 70, 87 T; 383/103

[56] References Cited

U.S. PATENT DOCUMENTS

| | | | |
|---|---|---|---|
| 1,927,913 | 9/1933 | Bennett | 150/52 M |
| 2,601,881 | 7/1952 | Oberlin, Sr. | 150/52 M |
| 3,955,749 | 5/1976 | Turkenkopf | 229/DIG. 3 X |
| 4,102,377 | 7/1978 | Ostrem | 150/52 M |
| 4,126,169 | 11/1978 | Magnuson et al. | 150/54 B |
| 4,458,738 | 7/1984 | Wilson | 150/52 M |

FOREIGN PATENT DOCUMENTS 2622427 11/1977 Fed. Rep. of Germany ... 150/52 M

Primary Examiner—William Price
Assistant Examiner—Sue A. Weaver
Attorney, Agent, or Firm—Frijouf, Rust & Pyle

[57] ABSTRACT

A cover is disclosed for preventing the impingement of solar radiation upon a steering wheel mounted on a steering wheel column. The cover comprises a first and a second sheet member each having a top edge, a bottom edge and plural side edges. Top interconnecting member interconnects the top edges of the first and second sheet members whereas side interconnecting member interconnect the plural side edges of the first and second sheet members to establish the first and second sheet members in a substantially parallel spaced apart relationship. The first and second sheet members may be disposed on opposed sides of the steering wheel when the top interconnecting member engages the top of the steering wheel and when the side interconnecting member engages the sides of the steering wheel to laterally position the first and second sheet members relative to the steering wheel. An aperture in the second sheet member accommodates the steering wheel column. The first sheet member is opaque for preventing the transmission of the solar radiation therethrough to protect the steering wheel from the solar radiation.

19 Claims, 12 Drawing Figures

U.S. Patent  Aug. 11, 1987  Sheet 1 of 2  4,685,499
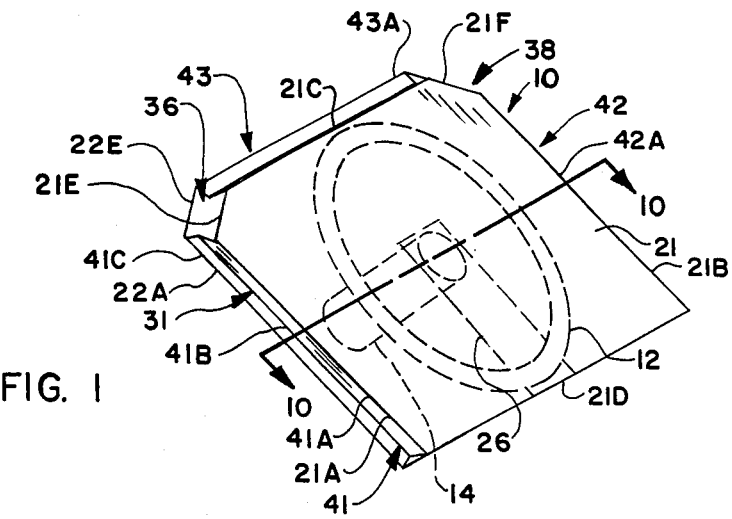
FIG. 1
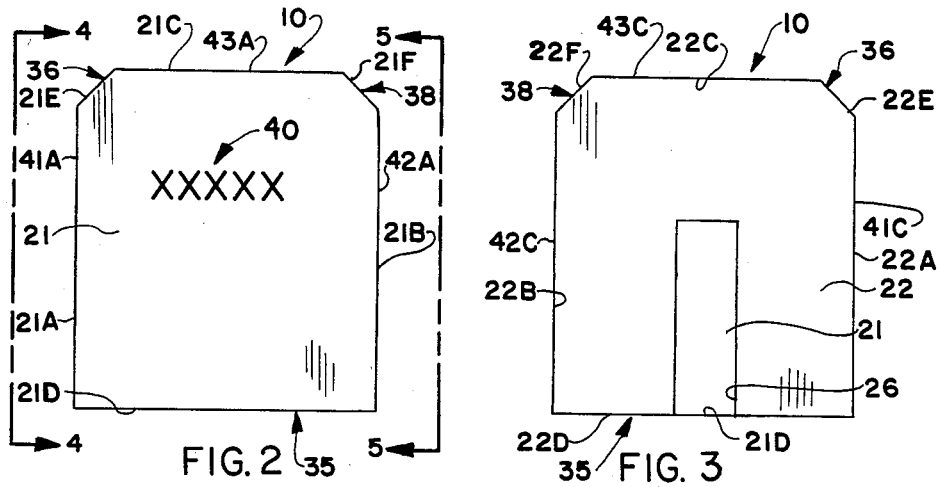
FIG. 2   FIG. 3
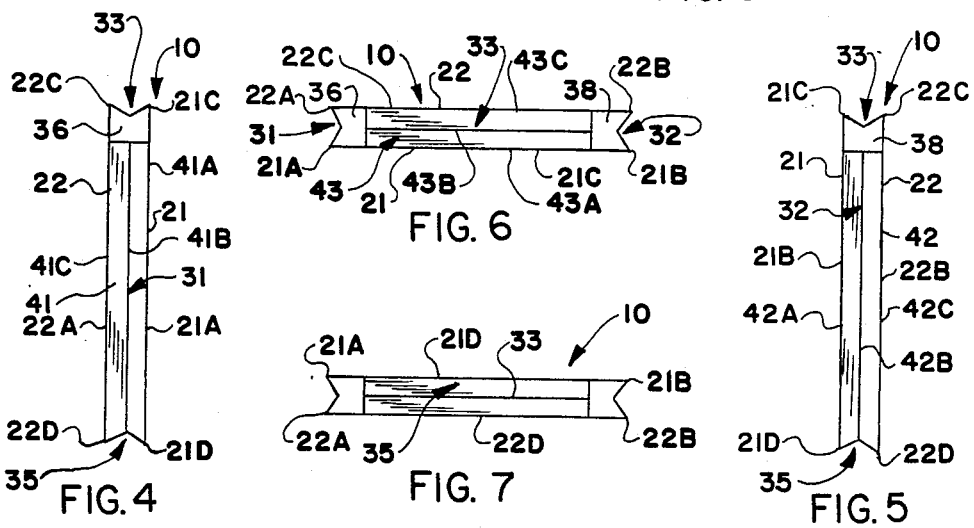
FIG. 4   FIG. 6   FIG. 5
FIG. 7

STEERING WHEEL COVER

BACKGROUND OF THE INVENTION

1. Field of the Invention

This invention relates to protective covers and more particularly to a protective cover for inhibiting the impingement of solar radiation on a steering wheel of a vehicle.

2. Information Disclosure Statement

Various types of covers for steering wheels have been proposed in the prior art. These covers are typically made of a flexible material such as leather, vinyl, cloth or other materials, and are utilized to protect the hands of a driver from grease, oil and the like, and to enhance the grip of a driver on the steering wheel. Prior art covers are generally designed to closely fit the steering wheel and are secured to the steering wheel by various methods including elastic, snap and lacing means. These covers generally may be removed for cleaning or replacement.

Steering wheel covers that are found in the prior art are employed to accomplish a different purpose, as discussed above, than the present invention. In addition, the prior arts covers have several disadvantages that the present invention seeks to remedy. The major disadvantage of the prior art covers is that they provide little protection from heat buildup due to solar radiation as the prior art covers are intimately attached to the steering wheel. Therefore, the prior art covers may even increase the temperature of the steering wheel over what the temperature would be without the cover. Other disadvantages of the prior art covers include difficulty in attaching the cover to the steering wheel and the high cost of the cover. In addition, the covers of the prior art are not readily disposable at the price charged for the covers.

It is a primary object of the invention to provide a cover for preventing the impingement of solar radiation upon a steering wheel.

Another object of the invention is to provide a cover comprising a first and a second sheet member with the first sheet member being opaque for preventing the transmission of solar radiation therethough and with the second sheet member having an aperture therein for accommodating a steering wheel column.

Another object of the invention is to provide a cover having top edges, plural side edges, bottom edges, with top and side interconnecting means for interconnecting the first and second sheet members to be in a substantially parallel spaced apart relationship.

Another object of the invention is to provide a cover wherein the top and side interconnecting means and the first and second sheet members are opaque for preventing the transmission of the solar radiation therethrough.

Another object of the invention is to provide a cover wherein the top and side interconnecting means are integral with the first and second sheet members and wherein the top and side interconnecting means comprise pleats for enabling the cover to be stored in a flat disposition.

Another object of the invention is to provide a cover wherein the top corners of the first and second sheet members are cut for defining plural vent apertures for allowing air ventilation through the cover.

Another object of the invention is to provide a cover constructed of paper or platic to be of a disposable nature.

Another object of the invention is to provide a cover for enabling advertising indicia to be disposed on the first sheet member for advertising a product.

Another object of the invention is to provide a cover having a frangible discount coupon for enabling a customer to remove the frangible discount coupon from the cover by tearing along perforations.

Another object of the invention is to provide a cover wherein the top and side interconnecting means engage the steering wheel at a substantially unitary point for minimizing contact of the cover with the steering wheel to reduce heat conduction from the cover to the steering wheel.

Another object of the invention is to provide a cover wherein the bottom edges of the cover define a bottom opening for permittign insertion of the steering wheel between the first and second sheet members.

Another object of the present invention is to provide a cover wherein the top and side interconnecting means enabling the first and second sheet members to be established in either a folded parallel relationship or an unfolded parallel relationship which perits a number of the covers to be packed together in a minimum amount of storage space.

The foregoing has outlined some of the more pertinent objects of the present invention. These objects should be construed to be merely illustrative of some of the more pertinent features and applications of the invention. Many other beneficial resuls can be obtained by applying the disclosed invention in a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The present invention is defined by the appended claims with the specific embodiment shown in the attached drawings. For the purpose of summarizing the invention, the invention relates to a cover for preventing the impingement of solar radiation upon a steering wheel mounted on a steering wheel column. The cover comprises a first and a second sheet member each having a top edge, a bottom edge and plural side edges. Top interconnecting means interconnects the top edges of the first and second sheet members respectively and side interconnecting means interconnect the plural side edges of the first and second sheet members respectively. The top interconnecting means and the side interconnecting means establish the first and second sheet members to be in a substantially parallel spaced apart relationship. The interconnecting means enable the first and second sheet members to be disposed on opposed sides of the steering wheel when said top interconnecting means engages the top of the steering wheel and when the side interconnecting means engages the sides of the steering wheel. The first and second sheet members are positioned proximate the steering wheel with an aperture in the second sheet membera ccommodating the steering wheel column. The first sheet member is opaque for preventing the transmission of the solar radiation therethrough enabling the first sheet member to protect the steering wheel from the solar radiation.

In a more specific embodiment of the invention, the second sheet member is opaque for preventing the transmission of the solar radiation therethrough. The top interconnecting means and the side interconnecting means are also opaque for preventing the transmission of the solar radiation therethrough.

The top and side interconnecting means are integral with the first and second sheet members and the top and side interconnecting means comprise pleats. The top and side interconnecting means have first and second connectors respectively connected to the first and second sheet members. A fold means is interposed between the first and second connectors of each of the first and second sheet members. The first and second connectors are integral with the first and second sheet members and comprise folds where the top and side interconnecting means meet in a juncture with the first and second sheet members.

The top edges of the first and second sheet members have top corners with the top corners being cut defining a plurality of vent apertures for allowing air ventilation through the cover.

The top and side interconnecting means of the cover engage the steering wheel of a substantially unitary point for minimizng contact of the cover with the steering wheel to reduce heat conduction from the cover to the steering wheel. The top and side interconnecting means enable the first and second sheet members to be established in a folded and an unfolded parallel relationship. The top and side interconnecting means enable the first and second sheet members to be established in a folded relationship with the first and second sheet members being parallel and in contact with one another and enable the first and second sheet members to be established in an unfolded relationship with the first and second sheet members being parallel and spaced apart from one another for receiving the steering wheel therebetween. The bottom edges of the cover define an opening for permitting insertion of the steering wheel between the first and second sheet members.

In another embodiment of the invention, the cover includes advertising indicia disposed on the first sheet member for advertising a product. Preferably, the cover is composed of paper or plastic and the cover is disposable.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and object of the invention, reference should be had to the following detailed description taken in connection with the accompanying drawings in which:

FIG. 1 is a perspective view of a cover disposed on a steering wheel;
FIG. 2 is a front view of the cover of FIG. 1;
FIG. 3 is a rear view of the cover of FIG. 1;
FIG. 4 is a left side view along the line 4—4 of FIG. 2;
FIG. 5 is a right side view along the line 5—5 of FIG. 2;
FIG. 6 is a top view of the cover as seen in FIG. 2;
FIG. 7 is a bottom view of the cover as seen in FIG. 2.

Similar reference characters refer to similar parts throughout the several views of the drawings.

DETAILED DISCUSSION

Figure 8:
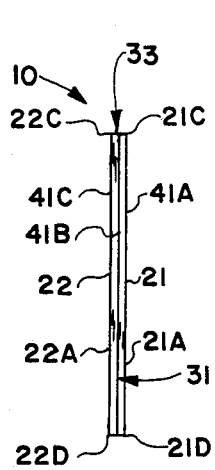
FIG. 8 is a side view of the cover in a folded condition for storage.

FIG. 1 is a perspective view of a cover 10 for preventing the impingement of solar radiation upon a steering wheel 12 mounted on a steering wheel column 14. The cover 10 comprises a first sheet member 21 and a second sheet member 22. The first sheet member 21 includes side edges 21A and 21B, a top edge 21C and a bottom edge 21D. Similaryly, the second sheet member 22 includes side edges 22A and 22B, a top edge 22C and a bottom edge 22D. The first sheet member 21 preferably has cut out top corners 21E and 21F. The second sheet member 22 similarly has cut out top corners 22E and 22F. The first sheet member 21 is opaque for preventing the transmission of solar radiation therethrough. The second sheet member 22 is provided with an aperture 26 therein for accommodating the steering wheel column 14. Preferably, the first and the second sheet members are formed of a flexible sheet material such as paper, plastic and the like.

The cover 10 includes interconnecting means for interconnecting the first sheet member 21 and the second sheet member 22. In this embodiment, the interconnecting means includes side interconnecting means 31 and 32 and top interconnecting means 33. The side interconnecting means 31 interconnects the side edges 21A and 22A whereas the side interconnecting means 32 interconnects the side edges 21B and 22B. The top interconnecting means interconnects the top edges 21C and 22C. The bottom edges 21D and 22D define an opening 35.

The opening 35 between the bottom edge 21D and 22D of the first and second sheet members 21 and 22 permit the insertion of the steering wheel 12 between the first sheet member 21 and the second sheet member 22. The side interconnecting means 31 and 32 and the top interconnecting means 33 establish the first sheet member 21 and the second sheet member 22 to be in a substantially parallel spaced apart relationship. The side interconnecting means 30 and 32 and the top inteconnecting means 38 enable the first sheet member 21 and the second sheet member 22 to be disposed on opposed sides of the steering wheel 12 when the top interconnecting means 33 engages the top of the steering wheel 12 and when the side interconnecting means 31 and 32 engage opposed sides of the steering wheel 12. The side interconnecting means 31 and 32 laterally position the first sheet member 21 and the second sheet member 22 relative to the steering wheel 12 and with the aperture 26 accommodating the column 14 of the steering wheel 12. When the cover 10 is laterally positioned on the steering wheel 12, the first sheet member 21 protects the steering wheel 12 from solar radiation. The cut out top corners 21E and 21F of the first sheet member 21 and the cut out top corners 22E and 22F of the second sheet member 22 define top vent apertures 36 and 38 for enabling air entering the bottom aperture 35 to vent through the top vent apertues 36 and 38.

FIGS. 2 is a front view of the cover 10 showing marking indicia 40 on the first sheet member 21. Preferably, the marking indicia 40 is in the form of an advertisement, a premium coupon, or the like. Accordingly, the cover 10 has a useful purpose as an advertisement, a premium coupon, or the like. The useful purpose as an advertisement, a premium coupon, or the like of the of the cover 10 is independent of preventing the impingement of solar radiation upon a steering wheel 12.

FIGS. 3-7 illustrate various views of the cover 10 showing the various features of the first and second sheet members 21 and 22, the interconnecting means 31-33 and the aperture 26. The interconnecting means 31-33 define folds 41-43 respectively. The fold 41 comprises a first fold 41A, a central fold 41B and a second fold 41C. Fold 42 comprises a first fold 42A, a central fold 42B and a second fold 42C whereas fold 43 comprises a first fold 43A, a central fold 43B and a second fold 43C. The first, second and third folds 41-43 enable the cover 10 to be disposed in either a folded condition as shown inFIG. 8 or an unfolded condition as shown in FIG. 9.

FIG. 8 is a side view of the cover 10 in a folded condition. The side interconnecting means 31 and 32 and the top interconnecting means 33 enable the first sheet member 21 and the second sheet member 22 to be established in a folded parallel relationship along folds 41-43. The first sheet member 21 and the second sheet member 22 are parallel and are in contact with one another allowing a number of covers 10 to be stored in a minimum amount of storage space.

Figure 9:
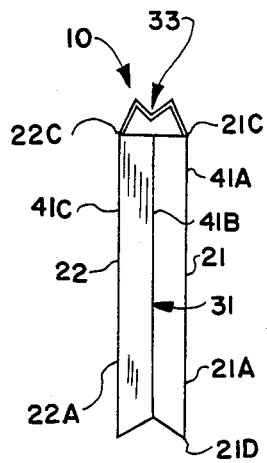
FIG. 9 is a side view of the cover in an unfolded condition.

FIG. 9 is a side view of the cover 10 in an unfolded condition. The side interconnecting means 31 and 32 and the top interconnecting means 33 enable the first sheet member 21 and the second sheet member 22 to be established in an unfolded parallel relationship along folds 41-43. The first sheet member 21 and the second sheet member 22 are parallel and are spaced apart from one another for accommodating the steering wheel 12 therebetween.

Figure 10:
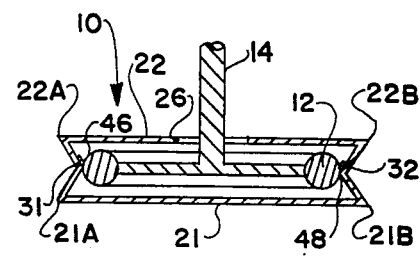
FIG. 10 is a sectional view of the cover along line 10—10 in FIG. 1.

FIG. 10 is a sectional view along line 10—10 of FIG. 1 illustrating the cover 10 disposed on the steering wheel 12. The side interconnecting means 31 and 32 of the cover engage sides of the steering wheel 12 at a substantially unitary points 46 and 48 for minimizing contact of the cover 10 with the steering wheel 12 to reduce heat conduction from the cover 10 to the steering wheel 12. Similarly, the interconnecting means 33 engage the top of the steering wheel 12 at a substantially unitary point for minimizing contact of the cover 10 with the steering wheel 12 to reduce heat conduction from the cover 10 to the steering wheel 12 as shown in FIG. 1.

Figure 11:
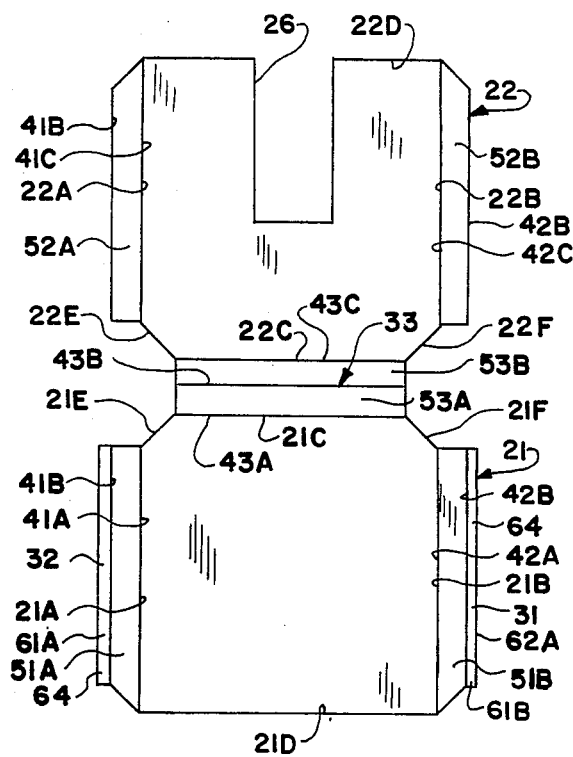
FIG. 11 is a plan view of the cover in an unassembled condition.

FIG. 11 is a plan view of the cover 10 in an unassembled condition illustrating the cover 10 as a unitary piece of sheet material. In this embodiment, the first and second interconnecting means 31 and 32 comprises side tabs 51A and 51B of the first sheet member 21, side tabs 52A and 52B of the second sheet member 22 and first and second connectors 61A and 61B. The first and second connectors 61A and 61B of the first sheet member 21 are bonded to the side tabs 52A and 52B of the second sheet member 22 in an overlapping relationship by suitable means shown in this embodiment as an adhesive 64. The third interconnecting means 33 comprises top tab 53A of the first sheet member 21 and top tab 53B of the second sheet member 22. The top tab 53A of the first sheet member 21 and top tab 53B of the second sheet member 22 are integrally connected to one another through folds 43A, 43B and 43C.

Figure 12:
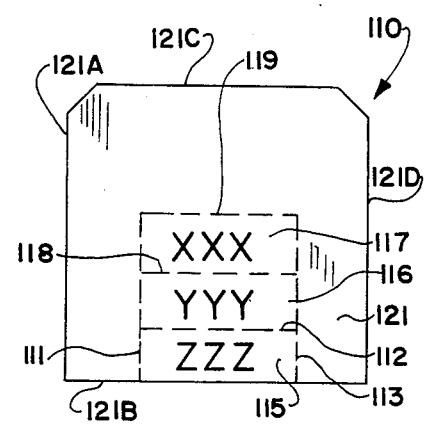
FIG. 12 is a front view similar to FIG. 2 of second embodiment of the cover of the present invention.

FIG. 12 is a front view similar to FIG. 2 of a second embodiment of the present invention illustration a cover 110, with first sheet member 121, side edges 121A and 121B, and top edge 121C, having perforations 111, 112 and 113 defining a frangible and removable portion shown as a coupon 115. The removable coupon 115 is preferably a redeemable coupon for enabling the use to remove the coupon 115 and obtain credit on the purchase of an unrelated item or product. In this embodiment, a pluraltiy of coupons 115, 116 and 117 are defined by perforations 111, 112, 113, 118 and 119.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A disposable cover for preventing the impingement of solar radiation upon a steering wheel mounted on a steering wheel column, comprising in combination:

a first and a second sheet member each having a top edge, a bottom edge and plural side edges;

said first sheet member being opaque for preventing the transmission of the solar radiation therethrough;

said second sheet member having an aperture therein for accommodating the steering wheel column;

top interconnecting means for interconnecting said top edges of said first and second sheet member respectively;

side interconnecting means for interconnecting said plural side edges of said first and second sheet members respectively;

said top interconnecting means and said side interconnecting means establishing said first and second sheet members to be in a substantially parallel spaced apart relationship for enabling said first and second sheet members to be disposed on opposed sides of the steering wheel when said top interconnecting means engage the top of the steering wheel and when said side interconnecting means engage the sides of the steering wheel to laterally position said first and second sheet members relative to the steering wheel and with said aperture of said second sheet member accommodating the steering wheel column enabling said first sheet member to protect the steering wheel from the solar radiation;

said bottom edges defining an opening for permitting insertion of the steering wheel between said first and second sheet members; and a vent aperture located proximate the top of said first and second sheet members for enhancing ventilation through the cover.

2. A disposable cover as set forth in claim 1, wherein said top and side interconnecting means enable said first and second sheet members to be established in a folded and an unfolded parallel relationship;

said interconnecting means enabling said first and second sheet members to be established in a folded relationship with said first and second sheet members being parallel and in contact with one another; and said interconnecting means enabling said first and second sheet members to be established in an unfolded relationship with said first and second sheet members being parallel and spaced apart from one another for receiving the steering wheel therebetween.

3. A disposable cover as set forth in claim 2, said first and second sheet members established in a folded relationship with said first and second sheet members being parallel and in contact with one another, providing the opportunity to store a plurality of the covers in a minimum amount of storage container space while the covers await use.

4. A disposable cover as set forth in claim 1, wherein said second sheet member and said top and side interconnecting means are opaque for preventing the transmission of the solar radiation therethrough.

5. A cover for preventing the impingement of solar radiation upon a steering wheel mounted on a steering wheel column, comprising:

a first and a second sheet member each having a top edge, a bottom edge and plural side edges;

said first sheet member being opaque for preventing the transmission of the solar radiation therethrough;

said second sheet member having an aperture therein the accommodating the steering wheel column;

top interconnecting means for interconnecting said tope dges of said first and second sheet members;

side interconnecting means for interconnecting said plural side edges of said first and second sheet members;

said top interconnecting means and said side interconnecting means establishing said first and second sheet members to be in a substantially parallel spaced apart relationship;

said top and side interconnecting means have first and second connectors respectively connected to said first and second sheet members;

fold means interposed between said first and second connectors of each of said first and second sheet members; and said interconnecting means enabling said first and second sheet members to be disposed on opposed sides of the steering wheel with said aperture of said second sheet member accommodating the steering wheel column to posiion said first sheet member to protect the steering wheel from the solar radiation.

6. A cover as set forth in claim 5, wherein said second sheet member is opaque for preventing the transmission of the solar radiation therethrough.

7. A cover as set forht in claim 5, wherein said top and side interconnecting means are opaque for preventing the transmission of the solar radiation therethrough.

8. A cover as set forth in claim 5, wherein said top and side interconnecting means are integral with said first and second sheet members.

9. A cover as set forth in claim 5, wherein said first and second connectors are integral with said first and second sheet members and comprise folds at a juncture of said first and second connectors of said first and second sheet members.

10. A cover as set forth in claim 5, including vent apertures located proximate the top of said first and second sheet members for enhancing ventilation through the cover.

11. A cover as set forth in claim 5, wherein perforations in the cover defining a frangible and removable portion for enabling a user to sever the removable portion from the cover.

12. A cover for preventing the impingement of solar radiation upon a steering wheel mounted on a steering wheel column, comprising:

a first and a second sheet member each having a top edge, a bottom edge and plural side edges;

said first sheet member being opaque for preventing the transmission of the solar radiation therethrough;

said second sheet member having an aperture thereinf or accommodating the steering wheel column;

top interconnecting means for interconnecting said top edges of said first and second sheet members;

side interconnecting means for interconnecting said plural side edges of said first and second sheet members;

said top interconnecting means and said side interconnecting means establishing said first and second sheet members to be in a substantially parallel spaced apart relationship;

said top edges of said first and second sheet member have top corners;

said top corners being cut for defining a plurality of vent apertures for allowing air ventilation through said cover;

said interconnecting means enabling said first and second sheet members to be disposed on opposed sides of the steering wheel with said aperture of said second sheet member accommodating the steering wheel column to position said first sheet member to protect the steering wheel from the solar radiation.

13. A cover as set foth in claim 12, wherein said top and side interconnecting means comprise folds.

14. A cover as set forth in claim 12, wherein said top interconnecting means engages the top of the steering wheel;

said side interconnecting means engaging the sides of the steering wheel to laterally position said first and second sheet member relative to the steering wheel.

15. A cover as set forth in claim 12, wherein said top and side interconnecting means engage the steering wheel at a substantially unitary point for minimizing contact of the cover with the steering wheel to reduce heat conduction from the cover to the steering wheel.

16. A cover as set forth in claim 12, wherein said cover is composed of a unitary flexible sheet material.

17. A cover as set forth in claim 12, wherein said top and side interconnecting means enable said first and second sheet members to be established in a folded and an unfolded parallel relationship;

said interconnecting means enabling said first and second sheet members to be established in a folded relationship with said first and second sheet members being parallel and in contact with one another; and said interconnecting means enabling said first and second sheet members to be established in an unfolded relationship with said first and second sheet members being parallel and spaced apart from one another for receiving the steering wheel therebetween.

18. A cover as set forth in claim 12, wherein the bottom edges of said first and second sheet members define an opening for permitting the insertion of the steering wheel between said first and second sheet members.

19. A cover as set forth in claim 12, including advertising indicia disposed on said first sheet member for advertising a product.

* * * * *

UNITED STATES PATENT AND TRADEMARK OFFICE
CERTIFICATE OF CORRECTION

PATENT NO. : 4,685,499

DATED : August 11, 1987

INVENTOR(S) : Todd Black

It is certified that error appears in the above-identified patent and that said Letters Patent are hereby corrected as shown below:

In the Claims

Claim 5, column 7, line 45, delete "tope dges" and insert therefor --top edges--.

Claim 5, column 7, line 63, delete "posiion" and insert therefor --position--.

Claim 11, column 8, line 16, delete "wherein" and insert therefor --including--.

Claim 12, column 8, lines 28 and 29, delete "thereinf or" bridging said lines and insert therefor --therein for--.

Signed and Sealed this

Twenty-ninth Day of December, 1987

Attest:

DONALD J. QUIGG

Attesting Officer

Commissioner of Patents and Trademarks